(12) United States Patent
Sanders-Reed

(10) Patent No.: US 7,925,391 B2
(45) Date of Patent: Apr. 12, 2011

(54) SYSTEMS AND METHODS FOR REMOTE DISPLAY OF AN ENHANCED IMAGE

(75) Inventor: John N. Sanders-Reed, Cedar Crest, NM (US)

(73) Assignee: The Boeing Company, Chicago, IL (US)

( * ) Notice: Subject to any disclaimer, the term of this patent is extended or adjusted under 35 U.S.C. 154(b) by 1603 days.

(21) Appl. No.: 11/142,941

(22) Filed: Jun. 2, 2005

(65) Prior Publication Data

US 2010/0017047 A1   Jan. 21, 2010

(51) Int. Cl.
  *G01C 23/00*   (2006.01)
(52) U.S. Cl. ............... 701/3; 345/8; 348/14.02; 359/630
(58) Field of Classification Search ............... 701/3, 213, 701/200; 715/700; 709/217; 340/971, 980; 345/7–8; 359/13, 629–63; 2/6.2, 6.5; 382/104, 382/294
See application file for complete search history.

(56) References Cited

U.S. PATENT DOCUMENTS

| | | | |
|---|---|---|---|
| 4,805,015 A | | 2/1989 | Copeland |
| 5,317,394 A | | 5/1994 | Hale et al. |
| 5,322,441 A | * | 6/1994 | Lewis et al. ............... 434/307 R |
| 5,325,472 A | | 6/1994 | Horiuchi et al. |
| 5,495,576 A | | 2/1996 | Ritchey |
| 5,561,756 A | | 10/1996 | Miller et al. |
| 5,805,341 A | | 9/1998 | Kuba |
| 5,904,729 A | | 5/1999 | Ruzicka |
| 5,935,190 A | | 8/1999 | Davis et al. |
| 6,140,980 A | * | 10/2000 | Spitzer et al. ..................... 345/8 |
| 6,157,747 A | | 12/2000 | Szeliski et al. |
| 6,195,455 B1 | | 2/2001 | Mack et al. |
| 6,400,364 B1 | | 6/2002 | Akisada et al. |
| 6,411,266 B1 | | 6/2002 | Maguire, Jr. |

(Continued)

FOREIGN PATENT DOCUMENTS

JP   7-053219   *   2/1995

(Continued)

OTHER PUBLICATIONS

Calibration of a head-mounted projective display for augmented reality systems; Hong Hua; Chunyu Gao; Ahuja, N.; Mixed and Augmented Reality, 2002. ISMAR 2002. Proceedings. International Symposium on; Digital Object Identifier: 10.1109/ISMAR.2002. 1115087; Publication Year: 2002 , pp. 176-185.*

(Continued)

*Primary Examiner* — Cuong H Nguyen
(74) *Attorney, Agent, or Firm* — Alston & Bird LLP

(57) ABSTRACT

A system for providing remote display of an enhanced image comprises at least one image source and a processing element. The processing element is capable of receiving data from the image source, creating an enhanced image with the received data, and transmitting the enhanced image via a wireless link to a display device capable of displaying the enhanced image. The processing element may create the enhanced image by stitching image data from at least two image sources having different fields of view, fusing image data from at least two image sources having different image modalities, or combining image data from at least one image source with synthetic image data. The processing element may be further capable of modifying at least one transmission characteristic based on a bandwidth of the wireless link. The transmission characteristic may be selected from the group comprising field of view, frame rate, resolution, and compression.

18 Claims, 3 Drawing Sheets

U.S. PATENT DOCUMENTS

| | | | |
|---|---|---|---|
| 6,414,712 | B1 | 7/2002 | Wanielik et al. |
| 6,525,731 | B1 | 2/2003 | Suits et al. |
| 6,567,086 | B1 | 5/2003 | Hashimoto |
| 6,636,185 | B1 * | 10/2003 | Spitzer et al. ............. 345/8 |
| 6,690,338 | B1 | 2/2004 | Maguire, Jr. |
| 6,791,540 | B1 | 9/2004 | Baumberg |
| 6,890,263 | B2 | 5/2005 | Hiraoka et al. |
| 6,897,858 | B1 | 5/2005 | Hashimoto et al. |
| 6,975,756 | B1 | 12/2005 | Slabaugh et al. |
| 7,126,630 | B1 | 10/2006 | Lee et al. |
| 7,130,447 | B2 * | 10/2006 | Aughey et al. ............. 382/103 |
| 7,245,273 | B2 * | 7/2007 | Eberl et al. ............. 345/7 |
| 7,283,307 | B2 * | 10/2007 | Couture et al. ............. 359/634 |
| 7,375,701 | B2 * | 5/2008 | Covannon et al. ............. 345/8 |
| 7,425,931 | B1 * | 9/2008 | Yamazaki et al. ............. 345/7 |
| 2002/0044152 | A1 | 4/2002 | Abbott et al. |
| 2002/0080143 | A1 | 6/2002 | Morgan et al. |
| 2002/0122117 | A1 | 9/2002 | Nakagawa et al. |
| 2002/0149585 | A1 | 10/2002 | Kacyra et al. |
| 2003/0026469 | A1 | 2/2003 | Kreang-Arekul et al. |
| 2003/0063192 | A1 | 4/2003 | Dodd et al. |
| 2003/0108223 | A1 | 6/2003 | Prokoski |
| 2003/0113006 | A1 | 6/2003 | Berestov |
| 2003/0120391 | A1 | 6/2003 | Saito |
| 2003/0164794 | A1 * | 9/2003 | Haynes et al. ............. 342/353 |
| 2004/0021917 | A1 | 2/2004 | Plesniak et al. |
| 2004/0051711 | A1 | 3/2004 | Dimsdale et al. |
| 2004/0095999 | A1 | 5/2004 | Piehl et al. |
| 2004/0105573 | A1 | 6/2004 | Neumann et al. |
| 2004/0105579 | A1 | 6/2004 | Ishii et al. |
| 2004/0125103 | A1 | 7/2004 | Kaufman et al. |
| 2004/0169617 | A1 | 9/2004 | Yelton et al. |
| 2004/0169663 | A1 | 9/2004 | Bernier |
| 2004/0247174 | A1 | 12/2004 | Lyons et al. |
| 2004/0257382 | A1 | 12/2004 | Van der Zijpp |
| 2005/0031169 | A1 * | 2/2005 | Shulman et al. ............. 382/104 |
| 2005/0046584 | A1 * | 3/2005 | Breed ............. 340/825.72 |
| 2006/0134001 | A1 | 6/2006 | Frangioni |
| 2006/0208193 | A1 | 9/2006 | Bodkin |
| 2006/0238536 | A1 | 10/2006 | Katayama et al. |

FOREIGN PATENT DOCUMENTS

| | | |
|---|---|---|
| WO | WO 9942854 A1 | 8/1999 |

OTHER PUBLICATIONS

Flying infrared for low level operations (FLILO) system description and capabilities; Guell, J.; Digital Avionics Systems Conference, 1999. Proceedings. 18$^{th}$; vol. 1/17 pp. vol. 1; Digital Object Identifier: 10.1109/DASC.1999.863712 Publication Year: 1999 , pp. 3.C.2-1-3. C.2-7 vol. 1.*

Optical free-form surfaces in off-axis head-worn display design; Cakmakci, O.; Vo, S.; Vogl, S.; Spindelbalker, R.; Ferscha, A.; Rolland, J.P.; Mixed and Augmented Reality, 2008. ISMAR 2008. 7th IEEE/ACM International Symposium on; Digital Object Identifier: 10.1109/ISMAR.2008.4637320; Publication Year: 2008 , pp. 29-32.*

A monocular video see-through head mounted display for interactive support system—Instruction of 3-dimensional position, posture and speed; Iwamoto, K.; Systems, Man and Cybernetics, 2009. SMC 2009. IEEE International Conference on Digital Object Identifier: 10.1109/ICSMC.2009.5346898; Publication Year: 2009 , pp. 865-870.*

A CMOS/LCOS image transceiver chip for smart goggle applications;Efron, U. et al.; Circuits and Systems for Video Technology, IEEE Transactions on;vol. 14 , Issue: 2;Digital Object Identifier: 10.1109/TCSVT.2003.819180; Publication Year: 2004 , pp. 269-273.*

Optimal Font Size for Head-Mounted-Displays in Outdoor Applications; Renkewitz, H.; Kinder, V.; Brandt, M.; Alexander, T.; Information Visualisation, 2008. IV '08. 12th International Conference; Digital Object Identifier: 10.1109/IV.2008.73 Publication Year: 2008 , pp. 503-508.*

A summary of efforts toward the definition of potential upgrades to the Joint Helmet Mounted Cueing System; Barnaba, J.M.; Orr, H.A.; Dayton Section Symposium, 1997., The 14th Annual AESS/IEEE; Digital Object Identifier: 10.1109/Dayton.1997.595091; Publication Year: 1997 , pp. 20-26.*

Head-worn displays: a review; Cakmakci, O.; Rolland, J.; Display Technology, Journal of; vol. 2 , Issue: 3; Digital Object Identifier: 10.1109/JDT.2006.879846; Publication Year: 2006 , pp. 199-216.*

Qiang Ji, Zhiwei Zhu; Eye and Gaze Tracking for Interactive Graphic Display; Int. Symp. on Smart Graphics; Jun. 2002; 7 pages; ACM 1-58113-216-Jun. 7, 2002; Hawthorne, New York. cited by other.*

Laurence R. Young, David Sheena; Methods & Designs—Survey of eye movement recording methods; 1975; pp. 397-429; vol. 7, No. 5, Behavior Research Methods and Instrumentation, Austin Texas; XP000770072. cited by other.*

Dennis J. Yelton, Ken L. Bernier, John N. Sanders-Reed, Processing System For An Enhanced Vision System, *SPIE 5424*, Apr. 2004.

Paul E. Debevec, Camillo J. Taylor, Jitendra Malik., "Modeling and Rendering Architecture from Photographs: A hybrid geometry-and-image-based approach", SIGGRAPH 96 conference preceedings, pp. 1-10.

Valerie A. Summers, Kellogg S. Booth, Tom Calvert, Evan Graham, Christine L. MacKenzie, "Calibration for Augmented Reality Experimental Testbeds", 1999.

Jeff Guell, "*FLILO (Flying Infrared for Low-level Operations) an Enhanced Vision System*," presented Apr. 2000 at SPIE AeroSense Conference 2000 in Orlando, Florida.

Lin Liang, Ce Liu, Ying-Qing Xu, Baining Guo, Heung-Yeung Shum, "Real-Time Texture Synthesis by Patch-Based Sampling", Jul. 2001.

Chad Jennings, Keith W. Alter, Andrew K. Barrows, Ken Bernier, Jeff Guell, "*Synthetic Vision as an Integrated Element of an Enhanced Vision System*," presented Apr. 1, 2002 at SPIE AeroSense Conference 2002 in Orlando, Florida.

* cited by examiner

SYSTEMS AND METHODS FOR REMOTE DISPLAY OF AN ENHANCED IMAGE

FIELD OF THE INVENTION

The present invention relates generally to vision systems, and more particularly, to vision systems capable of transmitting enhanced images to remote display devices.

BACKGROUND OF THE INVENTION

Despite the advent of many flight navigational aids, one of the most important tools for navigation of aircraft remains visual navigation. Many of today's aircrafts include various safety features such as on board radar, ground proximity warning systems, etc. that provide a pilot with added information about the airspace surrounding the aircraft. These systems are a tremendous resource to aid the pilot in obtaining better situational awareness during flight, by allowing the pilot to further interpret what the pilot is visually observing. However, there are instances where these various instruments become the pilot's only resource for information because the pilot's vision is hindered.

Visual hindrances may be due to bad weather, such as fog, snow, or rain, or they may be due to the time of day, such as night, dawn, or dusk. Further, some visual hindrances are due to the field of view limitations of the aircraft itself. Many aircraft cockpits have a field of view that is typically limited to a forward facing area that does not provide the pilot with adequate visualization to the sides and rear of the aircraft and also does not provide adequate vertical visualization above and below the aircraft.

Obstructed vision is an important safety concern in aircraft navigation, and there has been considerable effort devoted to providing systems that increase or enhance a pilot's view from the cockpit. Systems have been developed that include the use of one or more sensors that are located on the aircraft. The sensors are directed toward a selected field of view and provide images to a display system in the cockpit, where they are, in turn, displayed to the pilot. The sensors may be video cameras, infrared cameras, radar, etc. The systems allow the pilot to choose the types of images to view. For example, in nighttime flight or fog conditions, the pilot may opt to view images from the infrared and radar sensors, while under clear conditions, the pilot may use video camera feeds.

These systems may also include synthetic image sources. Specifically, many systems include mapping databases that include synthetic illustrations of various geographic features. These mapping databases can be coordinated with the actual position of the aircraft so that the synthetic images may be displayed to give the pilot a synthetic visualization of the terrain within the range of the aircraft.

An enhanced vision system (EVS) combines imagery from multiple sensors, providing an integrated awareness display to a user. An EVS may stitch imagery from sensors having different, perhaps partially overlapping fields of view (FOVs). An EVS may fuse imagery from different modality sensors (e.g., video, infrared or radar) having a common FOV. An EVS may combine sensor imagery with synthetic imagery, such as three dimensional terrain imagery from digital elevation maps, overhead satellite imagery, and/or flight path symbology. The output of an EVS is then typically displayed on a head-down, head-up, or helmet-mounted display (HMD).

One such EVS is disclosed in U.S. Pat. No. 5,317,394 to Hale et al., which is incorporated herein by reference. In this system, sensors are positioned on the exterior of the aircraft such that adjacent sensors have overlapped fields of view. Images from these various sensors are provided to a display system in the aircraft, where they are displayed to the pilot. The images are displayed in an overlapped configuration so as to provide a composite or mosaic image.

Other improvements to EVSs have been developed, such as those disclosed in U.S. Patent Application Publication No. 2004/0169617, entitled *Systems and Methods for Providing Enhanced Vision Imaging with Decreased Latency*, U.S. Patent Application Publication No. 2004/0169663, entitled *Systems and Methods for Providing Enhanced Vision Imaging*, and U.S. patent application Ser. No. 10/940,276, entitled *Situational Awareness Components of an Enhanced Vision System*, which are commonly assigned and incorporated herein by reference.

EVSs have been developed which include helmet-mounted display for displaying images from various sensors located on the aircraft. This type of system typically includes a helmet-tracking device that tracks movement of the pilot's head in order to determine the pilot's current line of sight (LOS) and field of view. Using this directional information, the system retrieves image data from the sensors that represent the line of sight in which the pilot is staring and displays this image on the helmet display. The image is updated as the pilot's head turns to different lines of sight.

In a conventional EVS in which the EVS display is located in proximity to the EVS processor, the EVS display, such as the HMD discussed above, is connected via a cable to the EVS. The cable may be, for example, an optical fiber cable. The EVS processor receives the user's LOS information via the cable from the HMD. The EVS processor then selects and blends the appropriate imagery to create an enhanced image. The enhanced image is sent via the cable to the HMD and displayed for the user. The cable connection between the EVS processor and the display enables full FOV, full frame rate, full resolution imagery to be sent and displayed continuously. Such a conventional EVS may be used, for example, in a manned aircraft.

Because of the multiple sensors of an EVS having different lines of sight and fields of view, EVSs are able to support multiple crew members of a single aircraft. For example, the view forward of the aircraft may be displayed for the pilot while the view below the aircraft may be displayed for the weapons operator.

The use of remotely-piloted or autonomously-piloted aircraft, often termed unmanned aerial vehicles (UAVs), is becoming more prevalent, particularly for military use. A UAV is typically controlled by a pilot located in a remote ground control station (GCS). The communication between the UAV and the GCS is via radio frequency (RF) or other wireless link, such as line-of-sight or Ku-band satellite communication.

In addition to the pilot, additional personnel, such as a weapons operator, may assist the pilot and may control aspects of the operation of the UAV. The additional personnel may be located in the same GCS as the pilot, or may be located in a separate GCS that may be located a great distance from the pilot's GCS.

In a conventional UAV, imagery from the UAV is sent to the GCS via the wireless link. The imagery may be provided by a gimbal-mounted camera system on the UAV. The direction in which the gimbal-mounted camera is directed (i.e., the camera's line of sight) may be controlled by the position of the pilot's HMD. This type of imagery system has drawbacks, however. The gimbal imposes drag and increases the radar signature of the UAV. Furthermore, when the camera is directed to view to the side or below the aircraft, as may be done for targeting purposes, there is no vision along the flight path of the UAV. Conversely, when the camera is directed along the flight path, as may be done for navigation purposes, there is no vision to the side or below the aircraft to enable the pilot to see and avoid potential threats to the UAV. This may be particularly problematic when the pilot requires a view along the flight path while a separate weapons operator requires a view below the UAV to target a weapon.

Because imagery from the UAV is transmitted to the GCS via the wireless link, issues may arise because of bandwidth limitations. The bandwidth of the wireless link between the UAV and the GCS may fluctuate for many reasons. Decreased bandwidth may prevent the GCS from receiving full field of view, full frame rate, full resolution imagery from the UAV. However, even when it is not possible to transmit full bandwidth imagery to the GCS, that imagery is available on board the vehicle and may be processed to provide warnings or other cueing to the remote human operators.

As such, there is a need for an imaging system for use with a UAV that will enable one or more remote users to receive imagery from different lines of sight without increased drag or radar signature. Additionally, there is a need for an imaging system that is capable of adjusting to fluctuations in the communication bandwidth while providing appropriate images to the users.

BRIEF SUMMARY OF THE INVENTION

A system and method are therefore provided in which an enhanced vision system creates enhanced images and transmits the enhanced images via a wireless link for display to a remote user, thereby enabling remote viewing of multiple lines of sight. Additionally, one or more transmission characteristics may be modified according to the available communication bandwidth.

In this regard, a system for providing remote display of an enhanced image comprises at least one image source and a processing element. The processing element is capable of receiving data from the image source, creating an enhanced image with the received data, and transmitting the enhanced image via a wireless link to a display device capable of displaying the enhanced image. The processing element may be capable of creating the enhanced image by performing at least one of stitching image data from at least two image sources having different fields of view, fusing image data from at least two image sources having different image modalities, or combining image data from at least one image source with synthetic image data.

In one embodiment, the processing element is further capable of modifying at least one transmission characteristic based on a bandwidth of the wireless link. The transmission characteristic may be selected from the group comprising field of view, frame rate, resolution, and compression. The processing element may modify the at least one transmission characteristic for all or only a portion of the transmitted enhanced image.

In one embodiment in which the enhanced image is a first enhanced image and the display device is a first display device, the processing element may be further capable of creating a second enhanced image and transmitting the second enhanced image via the wireless link to a second display device.

The processing element may be further capable of modifying at least one first transmission characteristic corresponding to the first enhanced image and at least one second transmission characteristic corresponding to the second enhanced image. Such a modification may be based on a bandwidth of the wireless link. Alternatively, such a modification may be based on respective requirements of users of the first and second display devices. The first and second transmission characteristics may be selected from the group comprising field of view, frame rate, resolution, and compression.

The processing element may be further capable of receiving line of sight data from the display device, such that the processing element receives data from the at least one image source corresponding to the line of sight data and the processing element creates the enhanced image corresponding to the line of sight data. In one embodiment, the display device is a helmet mounted display such that the line of sight data corresponds to a position of the helmet mounted display.

In addition to the system for providing remote display of an enhanced image as described above, other aspects of the present invention are directed to corresponding vehicle systems and methods for providing remote display of an enhanced image.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention provide systems and methods for use in enhanced vision displays. The systems and methods of embodiments of the present invention receive image data from a plurality of sources located at different positions on a vehicle or in an area of interest. The systems and methods assimilate the images from each source into a composite image. The system may also be provided with synthetic data from a data source. Both sensors and synthetic data sources are referred to herein as a source. The systems and methods of embodiments of the present invention detect the current line of sight of the user of the system. Based on this line of sight, the systems and methods may transmit an image representing the user's current field of view via a wireless link to a display such that the image may be displayed to the user. One or more characteristics of the transmission may be modified based on the available bandwidth.

It is first instructive to note that the systems and methods of the present invention can be used in any environment where visual situational awareness is a concern and remote image display is desired, be it in an aircraft, automobile, or other type of vehicle, whether manned or unmanned, or in a specified location or environment, such as a secured or surveillance area. In the below embodiments, the systems and methods are disclosed with regard to an unmanned aircraft. The aviation environment is a dynamic environment and aids in illustrating the robustness of the system. It is understood, however, that this is only one example of the use of the system and methods and that a wide variety of other applications are envisioned for use of the invention.

Figure 1A:
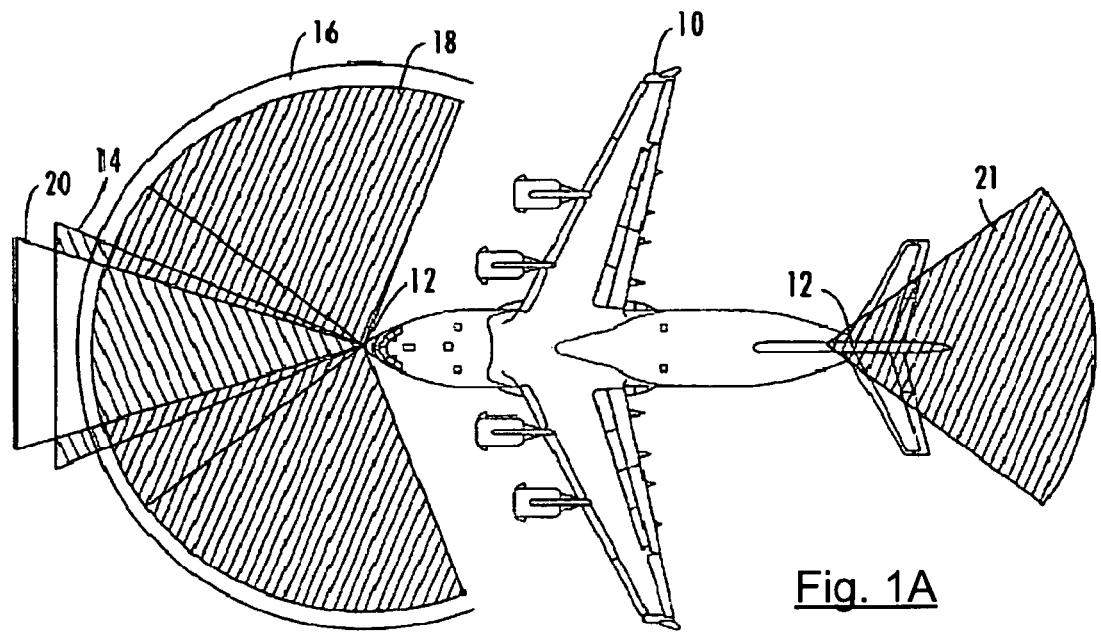
FIGS. 1A and 1B illustrate top and side views of an aircraft within which the systems and methods of the present invention may be implemented.
Figure 1B:
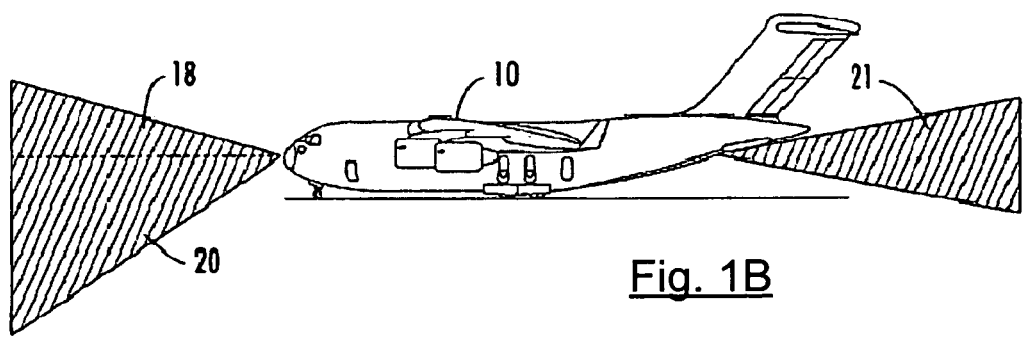

FIGS. 1A and 1B illustrate an aircraft 10, which may be an unmanned aerial vehicle, in which the systems and methods of the present invention may be incorporated. In this exemplary embodiment, the system of the present invention may include a plurality of sensors 12 located at various positions on the aircraft. Sensors are located at the front of the aircraft in different orientations to provide various forward 14, side 16, upward 18, and downward views 20. Further, in some embodiments, sensors may be located in the rear of the aircraft for rear views 21. While not illustrated, various sensors may also be located on the wings and top and bottom surfaces of the aircraft. Typical sensors used with the system are low-light level video cameras, long-wave infrared sensors, and millimeter wave radar, to name a few.

Figure 2:
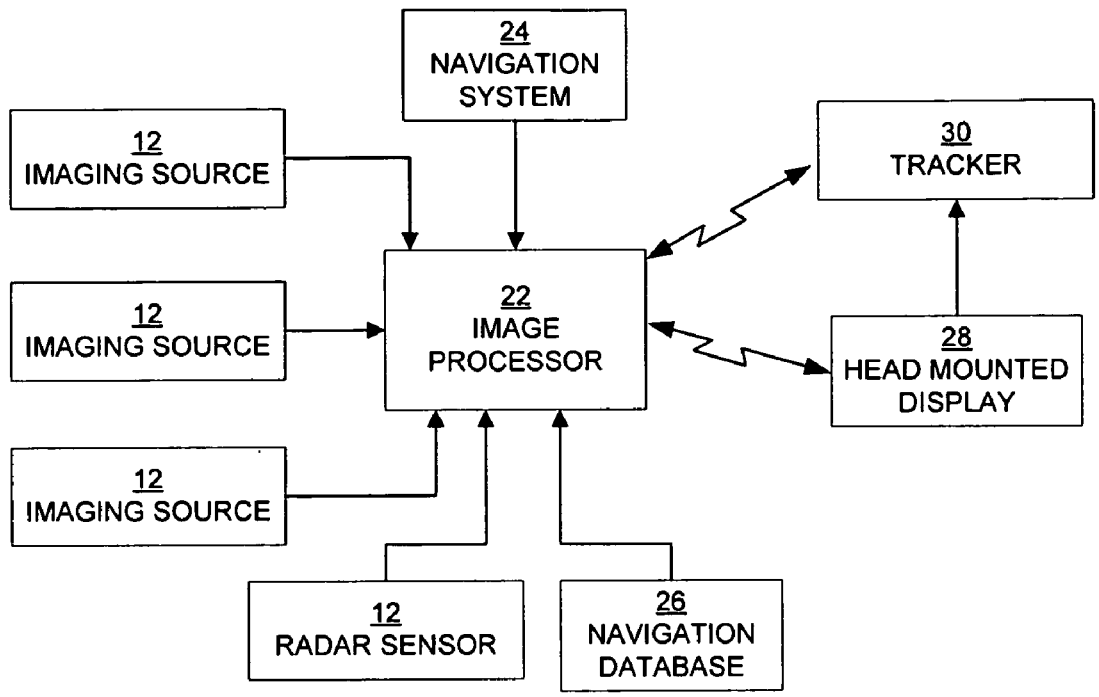
FIG. 2 is a block diagram of a system for providing an enhanced vision system, according to one embodiment of the present invention.

As illustrated in FIG. 2, the various sensors 12 are electrically connected to a processing element, such as an image processor 22, located on the aircraft. The image processor of the present invention is responsible for assimilating the various images from the sensors for display. Also connected to the image processor is a navigation system 24 for providing positional information, (i.e., longitude, latitude, pitch, roll, yaw, etc.), related to the aircraft. A navigational database 26 may also be available for providing synthetic navigational data to the system. Synthetic navigational data is typically 3D graphic data that simulates the terrain of other points of interest in a geographic location.

Also connected to the image processor is a display 28. In this particular embodiment, the display is a helmet-mounted display (HMD) located in the helmet of the pilot and/or other user. The pilot and/or other user would typically be located in a remote ground control station, as discussed above. Because the pilot and/or other user are not on the aircraft 10, communication between the image processor 22 and the HMD 28 is via an RF or other such wireless link. The wireless link may be line-of-sight or Ku-band satellite communication. Associated with the helmet is a helmet-tracking device 30. The helmet-tracking device provides information to the image processor concerning the present line of sight of the user. As the helmet-tracking device 30 is located with the HMD and is therefore also remote from the aircraft, the communication between the helmet-tracking device 30 and the image processor 22 is also typically via the wireless link.

It should be appreciated that the systems and methods of the exemplary embodiments of the present invention are not limited to embodiments in which the aircraft is a UAV and the pilot is located in a ground control station. Embodiments of the present invention may be used any time a wireless connection is desired between the image processor and the display. For example, in a conventionally piloted aircraft, authorization to engage a target may be provided by personnel on the ground. Such personnel would benefit from seeing enhanced imagery from the aircraft, such as may be provided by embodiments of the present invention. Alternatively, in a large aircraft, personnel such as weapons operators may be located a distance from the aircraft cockpit. It may be desirable in some aircraft to provide such personnel with wireless access to enhanced imagery using embodiments of the present invention. Additionally, the display 28 need not be an HMD, but may take many other forms if desired. For example, since a remote, ground based pilot will not have the same safety and support requirements as an on-aircraft pilot, the HMD shown could be replaced by lower cost Virtual Reality goggles.

Figure 3:
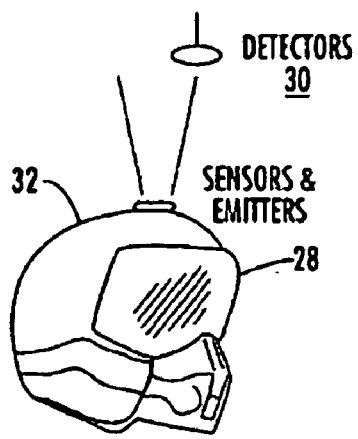
FIG. 3 is an illustration of a head mounted display with a helmet-tracking system for use with the present invention.

As illustrated in FIG. 3, a series of sensors or reflectors may be located at various positions on the helmet 32 worn by the user. The tracking device 30 of this embodiment is located at a position relative to the helmet and tracks the movement and orientation of the sensor to determine the line of sight of the user relative to the vehicle. It is understood here that a helmet-tracking device is not required for the invention. Instead of using such a device, the orientation of the vehicle itself or a joystick control, etc. could be used to determine the user's line of sight. Similarly, in a security or surveillance location environment, the line of sight could be a fixed value trained on the view of interest.

Because imagery from the image processor is transmitted to the HMD via the RF or other wireless link, bandwidth limitations may prevent the HMD from receiving full field of view, full frame rate, full resolution, uncompressed imagery from the image processor. As such, the systems and methods of the present invention may modify one or more transmission characteristics to enable the HMD to receive the enhanced image desired by the user. The transmission characteristics may include field of view, frame rate, resolution, and compression percentage. The field of view defines the size of the area imaged. A user may desire a larger field of view when navigating the aircraft and a smaller field of view when targeting weapons. The frame rate defines how quickly the displayed image is updated. A user may desire a faster frame rate when attempting to evade air defenses, but a slower frame rate may be acceptable when targeting weapons if the targeted object is stationary. The resolution defines how many pixels are displayed within a defined image area. A user may desire a higher resolution when targeting weapons, but a lower resolution may be acceptable when navigating the aircraft. The signal transmission to the HMD may be compressed if required due to the bandwidth limitation. The compression percentage defines how much the signal is compressed.

The bandwidth required to transmit an enhanced image is affected by the FOV, the frame rate, the resolution, and the compression percentage. The required bandwidth may be expressed by the following equation: required bandwidth=FOV×frame rate×resolution×compression percentage. As can be seen from this equation, the required bandwidth can be adjusted by modifying one or more of these transmission characteristics. Similarly, one or more of these transmission characteristics may be modified in response to a change in the available bandwidth, such that the best image possible given the available bandwidth may be transmitted. The image processor may make such a modification in response to a change in the available bandwidth. For example, if the bandwidth decreases, the image processor may reduce the FOV of the image, without changing the frame rate, resolution, or compression. Alternatively, the image processor may reduce the frame rate if the available bandwidth decreases, without changing the other characteristics. One or more transmission characteristics can be increased or decreased as the image processor adjusts to the available bandwidth while selecting the mix of settings that will enable the image to be displayed on the HMD to be appropriate to the requirements of the user. It should be appreciated that this determination is typically a "trade-off" among the transmission characteristics. Ideally, the image processor would transmit full FOV, full frame rate, full resolution, uncompressed imagery to the HMD if the available bandwidth were sufficient. When the available bandwidth is not sufficient, the image processor will typically modify one or more transmission characteristics such that the image processor will provide an enhanced image which, while of lower quality than would be sent with sufficient bandwidth, is still adequate for the task being performed by the user.

When the available bandwidth is insufficient, the image processor may determine which transmission characteristic(s) to modify based on specified parameters and/or user selection. The parameters may include the current position of the aircraft relative to the recorded flight plan, such that the image processor knows, for example, the current distance to the target. The image processor may determine the likely desired transmission characteristics based on the current aircraft location. For example, when the aircraft is near the departure point the pilot is likely to be navigating and may desire full field of view at the expense of resolution. When the aircraft is near the destination (i.e., the target) the weapons operator is likely to be targeting weapons and may desire full resolution at the expense of field of view. Such determinations may be predefined, or may be based on user selection. The user may be able to select among a plurality of operating modes, such as navigation, evasion, targeting, searching, surveillance, etc., while operating the UAV. The image processor may modify the transmission characteristics in a predefined manner and a predefined order based on the selected operating mode. For example, when the user selects navigation mode, the image processor may be programmed to transmit full FOV and to decrease resolution first and frame rate second as necessary to enable full FOV. When the user selects targeting mode, the image processor may be programmed to transmit full resolution and to decrease FOV first and frame rate second as necessary to enable full resolution. When the user selects evasion mode, the image processor may be programmed to transmit full frame rate and to decrease resolution first and FOV second as necessary to enable full frame rate.

The extent of the modifications for each transmission characteristic may also be limited based on predefined parameters. In the navigation mode example above, the resolution is decreased first and the frame rate is decreased second as necessary to enable full FOV. The image processor may be programmed to decrease the resolution by as much as necessary to transmit full FOV, but in any event no more than a twenty-five percent decrease in resolution. If decreasing the resolution by twenty-five percent does not enable full FOV, then the image processor may be programmed to reduce the frame rate by as much as necessary to transmit full FOV, but in any event no more than a fifty percent decrease in frame rate. If decreasing both the resolution and the frame rate by the maximum defined amount does not enable full FOV, then the image processor may decrease the FOV as required to transmit the enhanced image with the available bandwidth. Similar limits may be defined for each transmission characteristic, separately and/or in conjunction with each defined operating mode.

While the transmission characteristics may be modified uniformly across the image, the transmission characteristics may also be modified for only a portion of the image. Similarly, the transmission characteristics may be modified one way for one portion of the image and a different way for another portion of the image. For example, the center portion of an image may be transmitted at a higher resolution than the periphery of the image, with the periphery transmitted at a higher frame rate that the center. Such a modification would, for example, enable the weapons operator to view the target (in the center of the image) at high resolution to ensure accurate targeting, while enabling the pilot to have a frequently refreshed image of a large FOV to track incoming aircraft or air defenses.

While the imagery transmitted to the ground may not be sufficient to perform certain stressing tasks (such as wire detection or small moving target detection), full rate, full resolution imagery is available on board the aircraft. Intelligent agents, such as described in commonly assigned U.S. patent application Ser. No. 10/940,276, entitled *Situational Awareness Components of an Enhanced Vision System*, may be incorporated into the aircraft and used to examine and process this full resolution on-board data, even for directions in which the user is not currently looking. The intelligent agent may then transmit an alert to the remote users, based on the processing of the full resolution data. Further, based on these alerts, the transmission characteristics may be modified to optimize the transmitted imagery to enable the remote user to detect the item of interest.

More than one enhanced image may be created and transmitted via the wireless link from the UAV. For example, an enhanced image with a LOS forward of the aircraft may be created for and transmitted to the pilot, while an enhanced image with a LOS below the aircraft may be created for and transmitted to the weapons operator. As the transmission of two or more enhanced images will typically require two or more times as much bandwidth as for a single enhanced image, the modification of transmission characteristics may be especially important in such a situation. Where two or more enhanced images are to be transmitted via the wireless link from the UAV, the transmission characteristics for each image may be independently modified. Such independent modifications may be based, for example, on the individual requirements of the user who will be viewing each respective enhanced image. For example, the enhanced image transmitted to the pilot may have a decreased resolution to enable a larger field of view, while the enhanced image transmitted to the weapons operator may have a decreased field of view to enable a greater resolution. Additionally, the percentage of the bandwidth that is used to transmit each enhanced image to each respective user may be varied, depending on the requirements of each user. For example, when the aircraft is en route to the target a larger percentage of the bandwidth (e.g., seventy-five percent) may be used to transmit the enhanced image of the forward line of sight to the pilot, while the remaining percentage (e.g., twenty-five percent) of bandwidth may be used to transmit the enhanced image of the line of sight beneath the aircraft to the weapons operator. When the aircraft is approaching the target, a larger percentage of the bandwidth may be used to transmit the enhanced image of the target area to the weapons operator to enable accurate targeting, at the expense of the percentage of the bandwidth dedicated to transmitting the enhanced image of the forward line of sight to the pilot. Modifying the transmission characteristics separately for each transmitted enhanced image enables the image processor to use a different amount of bandwidth for the transmission of each enhanced image.

Figure 4:
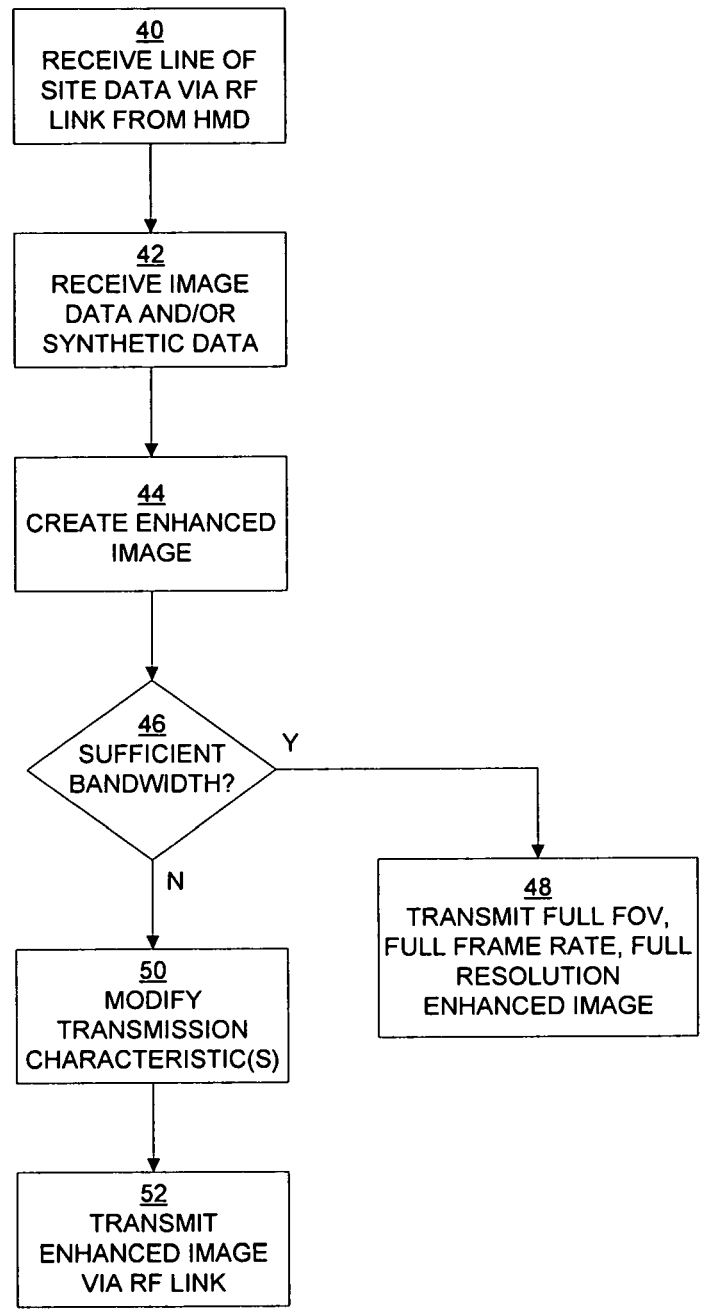
FIG. 4 is a flowchart illustrating the operation of providing remote display of an enhanced image, according to one embodiment of the present invention.

FIG. 4 is a flowchart illustrating the operation of providing remote display of an enhanced image, according to one embodiment of the present invention. The image processor will typically receive line of sight data via the wireless link from the HMD. See block 40. In the embodiment above, this line of sight data is typically based on the position of the HMD. As the HMD is worn by the pilot or other user, the position of the HMD correlates to the direction in which the pilot or other user is looking relative to the flight path of the UAV. Based on the line of sight data, the image processor receives image data from the image sensors corresponding to the line of sight. See block 42. The image processor may also receive synthetic image data corresponding the user's line of sight, such as from the navigational database 26 of FIG. 2. The image processor uses the image data and synthetic data to create an enhanced image using known methods for creating enhanced images. See block 44. As discussed above, this process may involve stitching imagery from sensors having different FOVs, fusing imagery from different modality sensors, and/or combining sensor imagery with synthetic imagery. Methods for creating enhanced images are disclosed in the following commonly assigned applications: U.S. Patent Application Publication No. 2004/0169617, entitled *Systems and Methods for Providing Enhanced Vision Imaging with Decreased Latency*, U.S. Patent Application Publication No. 2004/0169663, entitled *Systems and Methods for Providing Enhanced Vision Imaging*, and U.S. patent application Ser. No. 10/940,276, entitled *Situational Awareness Components of an Enhanced Vision System*. The image processor determines whether the bandwidth of the wireless link is sufficient to transmit the enhanced image without modifying one or more of the transmission characteristics. See block 46. This determination may be made after the enhanced image is created. This determination may alternatively be made concurrently with or prior to creation of the enhanced image, based on the anticipated bandwidth requirement. If it is determined in block 46 that the bandwidth is sufficient to transmit full FOV, full frame rate, full resolution, uncompressed imagery to the HMD, then the image processor transmits the enhanced image without modification of the transmission characteristics. See block 48. If it is determined in block 46 that the bandwidth is not sufficient to transmit full FOV, full frame rate, full resolution, uncompressed imagery to the HMD, then the image processor modifies one or more of the transmission characteristics to enable the transmission of an adequate enhanced image to the HMD. See block 50. The technique used by the image processor to modify the transmission characteristics is discussed in detail above. After the transmission characteristics have been modified, the enhanced image is transmitted via the wireless link to the HMD or other display. See block 52.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive, sense only and not for purposes of limitation.

That which is claimed is:

1. A vehicle system for providing remote display of an enhanced image, the vehicle system comprising:
    a vehicle body;
    at least one image source mounted on the vehicle body; and
    a processing element configured to receive data from the image source; the processing element further configured to create an enhanced image with the received data by performing at least one of stitching image data from at least two image sources having different fields of view, fusing image data from at least two image sources having different image modalities, or combining image data from at least one image source with synthetic image data; the processing element further configured to provide for transmission of the enhanced image via a wireless link to a display device capable of displaying the enhanced image,
    wherein the processing element is further configured to modify at least one transmission characteristic of the enhanced image based on a bandwidth of the wireless link and further based on at least one of a location of the vehicle body or an operating mode of the vehicle system,
    wherein the processing element is further configured to receive line of sight data from the display device, such that the processing element receives data from the at least one image source corresponding to the line of sight data and the processing element creates the enhanced image corresponding to the line of sight data, wherein the display device comprises one of a helmet mounted display or virtual reality goggles and wherein the line of sight data corresponds to a position of the display device.

2. The vehicle system of claim 1, wherein the vehicle body is an aircraft, and wherein the processing element is configured to provide for transmission of the enhanced image via the wireless link to the display device offboard the aircraft.

3. The vehicle system of claim 1, wherein the transmission characteristic is selected from the group comprising field of view, frame rate, resolution, and compression.

4. The vehicle system of claim 1, wherein the processing element modifies the at least one transmission characteristic for only a portion of the transmitted enhanced image.

5. The vehicle system of claim 1, wherein the enhanced image is a first enhanced image, wherein the display device is a first display device, and wherein the processing element is further configured to create a second enhanced image and transmit the second enhanced image via the wireless link to a second display device.

6. The vehicle system of claim 5, wherein the processing element is further configured to modify at least one first transmission characteristic corresponding to the first enhanced image and at least one second transmission characteristic corresponding to the second enhanced image based on a bandwidth of the wireless link, wherein the first and second transmission characteristics are selected from the group comprising field of view, frame rate, resolution, and compression.

7. The vehicle system of claim 6, wherein the processing element is further configured to independently modify the first and second transmission characteristics based on respective requirements of users of the first and second display devices.

8. The system of claim 5, wherein the processing element is configured to allocate different portions of the bandwidth of the wireless link to transmission of the first and second enhanced images based upon at least one of the location of the vehicle body or the operating mode of the vehicle system.

9. A vehicle system for providing remote display of an enhanced image, the vehicle system comprising:
    a vehicle body;
    at least one image source mounted on the vehicle body; and
    a processing element configured to receive data from the image source; the processing element further configured to create an enhanced image with the received data by performing at least one of stitching image data from at least two image sources having different fields of view, fusing image data from at least two image sources having different image modalities, or combining image data from at least one image source with synthetic image data; the processing element further configured to provide for transmission of the enhanced image via a wireless link to a display device capable of displaying the enhanced image, wherein the processing element is further configured to receive line of sight data from the display device, such that the processing element receives data from the at least one image source corresponding to the line of sight data and the processing element creates the enhanced image corresponding to the line of sight data, wherein the display device is a helmet mounted display and wherein the line of sight data corresponds to a position of the helmet mounted display.

10. A system for providing remote display of an enhanced image, the system comprising:
  at least one image source; and
  a processing element configured to receive data from the image source; the processing element further configured to create an enhanced image with the received data; the processing element further configured to modify at least one transmission characteristic of the enhanced image based on a bandwidth of a wireless link, wherein the transmission characteristic is selected from the group comprising field of view, frame rate, resolution, and compression; the processing element further configured to transmit the enhanced image via the wireless link to a display device capable of displaying the enhanced image,
  wherein the processing element is further configured to receive line of sight data from the display device, such that the processing element receives data from the at least one image source corresponding to the line of sight data and the processing element creates the enhanced image corresponding to the line of sight data, wherein the display device is one of a helmet mounted display or virtual reality goggles and wherein the line of sight data corresponds to a position of the display device.

11. The system of claim 10, wherein the processing element is configured to create the enhanced image by performing at least one of stitching image data from at least two image sources having different fields of view, fusing image data from at least two image sources having different image modalities, and combining image data from at least one image source with synthetic image data.

12. The system of claim 10, wherein the processing element modifies the at least one transmission characteristic for only a portion of the transmitted enhanced image.

13. The system of claim 10, wherein the enhanced image is a first enhanced image, wherein the display device is a first display device, and wherein the processing element is further configured to create a second enhanced image and transmit the second enhanced image via the wireless link to a second display device.

14. The system of claim 13, wherein the modified at least one transmission characteristic is a first transmission characteristic corresponding to the first enhanced image, wherein the processing element is further configured to modify at least one second transmission characteristic corresponding to the second enhanced image based on the bandwidth of the wireless link, wherein the second transmission characteristic is selected from the group comprising field of view, frame rate, resolution, and compression.

15. The system of claim 14, wherein the processing element is further configured to independently modify the first and second transmission characteristics based on respective requirements of users of the first and second display devices.

16. The system of claim 10, wherein the processing element is further configured to modify at least one transmission characteristic of the enhanced image based on at least one of a location or an operating mode of the system.

17. The system of claim 10, wherein the system is carried an aircraft, and wherein the processing element is configured to provide for transmission of the enhanced image via the wireless link to the display device offboard the aircraft.

18. The system of claim 13, wherein the processing element is configured to allocate different portions of the bandwidth of the wireless link to transmission of the first and second enhanced images based upon at least one of a location or an operating mode of the system.

* * * * *